UNITED STATES PATENT OFFICE.

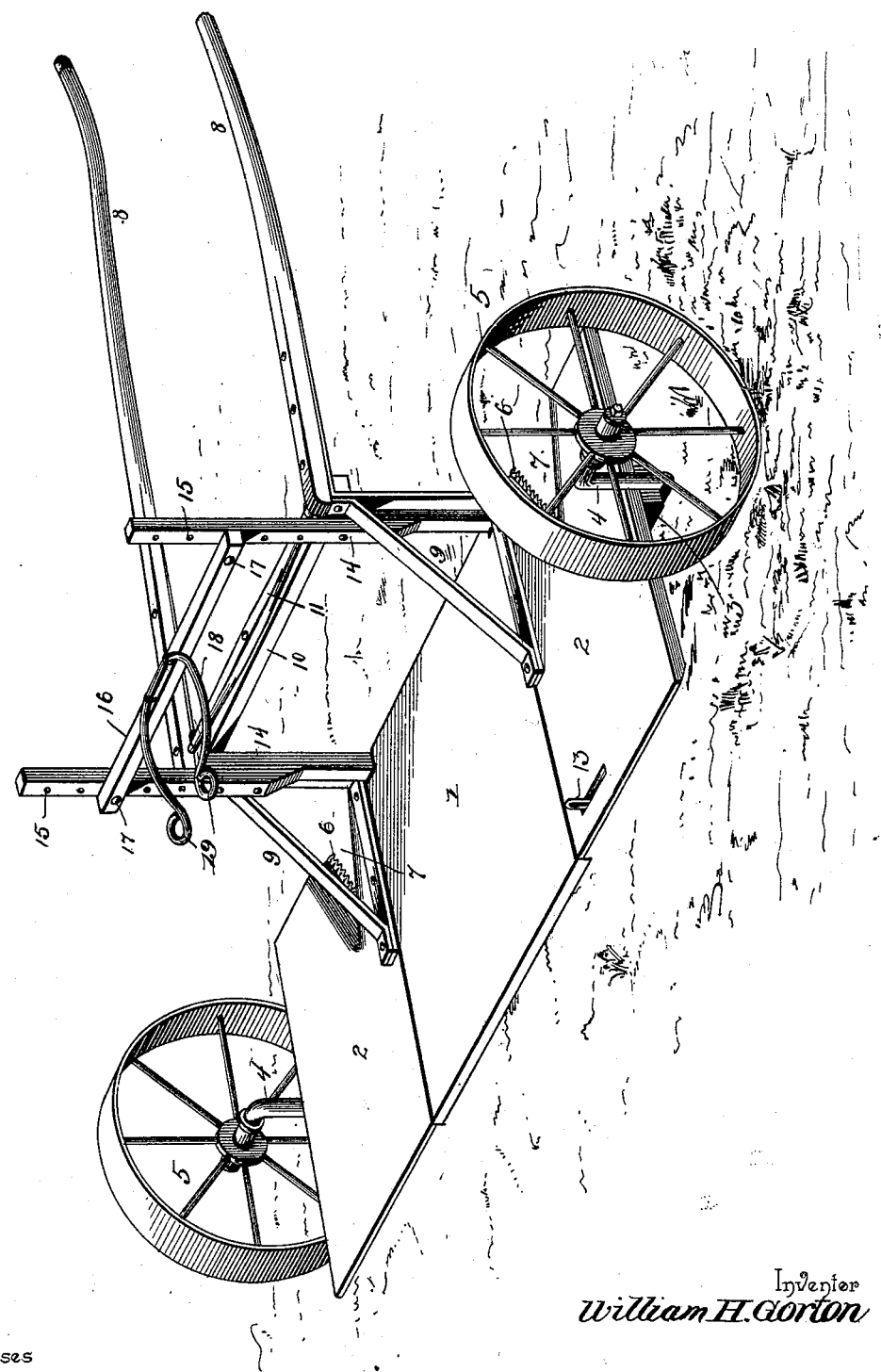

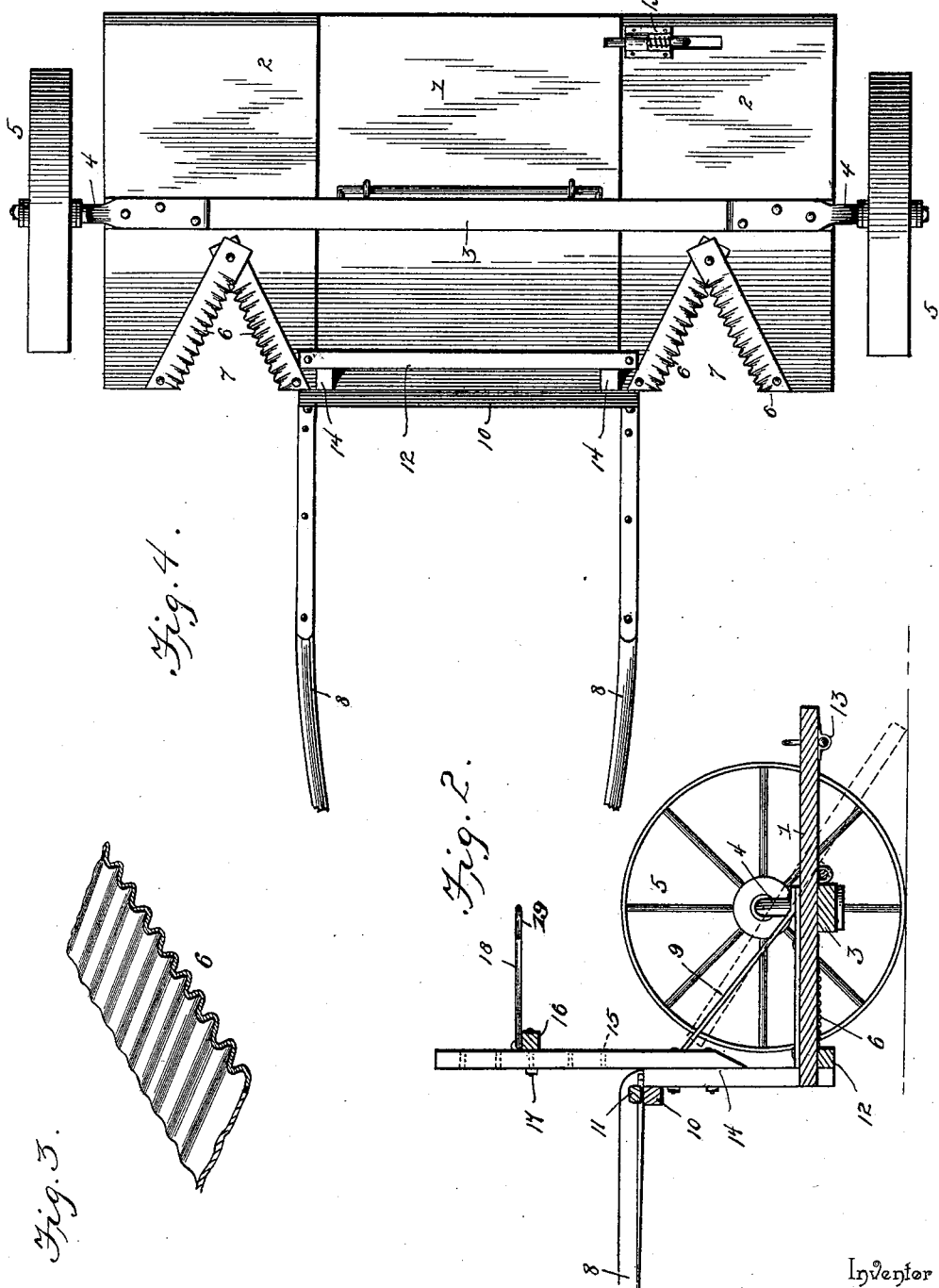

WILLIAM H. GORTON, OF ANGOLA, KANSAS, ASSIGNOR OF ONE-HALF TO THOMAS SCURR, JR., OF COFFEYVILLE, KANSAS.

CORN-HARVESTER.

SPECIFICATION forming part of Letters Patent No. 594,246, dated November 23, 1897.

Application filed August 1, 1896. Serial No. 601,390. (No model.)

*To all whom it may concern:*

Be it known that I, WILLIAM H. GORTON, a citizen of the United States, residing at Angola, in the county of Labette and State of Kansas, have invented a new and useful Corn-Harvester, of which the following is a specification.

This invention relates to machines for cutting, harvesting, and shocking corn and like stalky growths.

The object of the invention is to provide a machine of simple construction for the purposes aforesaid which will enable one or two rows of stalks being cut at the same time, according as required, and which is of comparatively light draft, so as to be drawn over the field by a single horse, the latter walking between the rows being cut.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a corn-harvester especially designed for attaining the objects of this invention. Fig. 2 is a longitudinal section showing by dotted lines the position of the shock-forming platform when tilted. Fig. 3 is a detail view of a portion of a cutting-blade. Fig. 4 is a view of the machine inverted.

Corresponding and like parts are referred to in the following description and indicated in the several views of the drawings by the same reference-characters.

The platform comprises middle and end sections 1 and 2, respectively, and is mounted upon an axle 3, upon which the middle section 1 or shock-forming platform tilts. Crank-spindles 4 are bolted or otherwise secured to the ends of the axle 3 and receive ground-wheels 5, which have a broad tread to prevent the sinking or cutting of the wheels into the ground to such an extent as to interfere with the advancing of the machine over the field. The end sections 2 have V-shaped throats or passages in their front ends into which the corn or stalks to be cut enter as the machine is drawn over the field. Cutting-blades 6 are located upon opposite sides of the throats or V-passages 7 and their cutting edges are toothed or serrated, so as to cut the stalks by a shear or sawing action. The blades 6 are fluted or corrugated, and the tooth-like edge is produced by sharpening the blades in the usual way.

The thills or shafts 8 are secured at their rear ends to the inner edges of the sections 2, adjacent to the outer edges of the section or shock-forming platform 1, and are strengthened by braces 9, which form guards to retain the stalks in place after being set upon the shock-forming platform. The cross-bar 10, connecting the thills near their inner ends, prevents the stalks resting upon the platform 1 from moving forward and at the same time strengthens and braces the thills at their inner ends and receives the singletree 11.

The platform 1 has a hinge or pivotal connection with the axle 3 and is supported at its front end by a cross-bar 12 and at its rear end by a spring-actuated latch-bolt 13, the latter having a portion extending through a slot in an end section of the platform to admit of the bolt being operated by a foot of an attendant. Uprights 14 are secured at their lower ends to the cross-bar 12 and the end sections 2 and are formed with a series of openings 15 in their length. A cross-beam 16 has adjustable connection with the uprights 14 by pins or bolts 17, passing through openings near the ends of the cross-beam and through any one of the openings 15. A spring-holder 18 is attached to the cross-beam 16 and is movable with the latter, so as to admit of its elevation above the platform being regulated according to the height or length of the stalks to be formed into a shock. This spring-holder 18 is constructed of stout wire, which is bent into an approximately circular form, the ends being separated to provide a passage for the entrance of the corn or stalks when forming the shock and curled or bent to provide eyes 19 to be grasped when it is required to spread the arms of the holder to release the shock after the latter has reached the required dimensions and when it is required to deposit the same upon the ground.

As the machine is drawn over the field the stalks cut by the blades 6 are received in the arms of attendants upon the end sections of the platform, and as fast as the stalks are cut they are placed upon the platform 1 and their upper ends engaged with the holder 18 by being passed between its spring-arms, and when a sufficient number of stalks have accumulated upon the platform 1 to form a shock of required size the latch-bolt 13 is operated so as to release the platform and the shock is disengaged from the holder and the platform tilted so as to dump the shock upon the ground, the latter operation being facilitated by the forward movement of the machine.

Having thus described the invention, what is claimed as new is—

1. In a corn-harvester, the combination of a shock-forming platform mounted to tilt rearwardly, fixed platforms at the sides of the shock-forming platform provided with cutting apparatus, uprights at the inner forward corners of the side platforms, a cross-bar connecting the uprights intermediate of their ends and extending in front of the shock-forming platform to limit the forward movement of the stalks, thills secured to the cross-bar, braces connecting the terminals of the cross-bar and the rear ends of the thills with the side platforms and forming guards between them and the shock-forming platform, and a cross-beam having adjustable connection with the said uprights and provided with a shock-holder, substantially as set forth.

2. In a corn-harvester, the combination with a platform provided with cutting mechanism, of a spring-holder for receiving and retaining the stalks during the formation of a shock, constructed of a single length of stout wire bent into an approximately circular form and having its end portions separated for the ready admission of the stalks and bent to provide finger-grips, substantially as set forth.

In testimony that I claim the foregoing as my own I have hereto affixed my signature in the presence of two witnesses.

WILLIAM H. GORTON.

Witnesses:
 WILLIAM H. SHEPARD,
 SAMUEL McMURTRY.